(12) United States Patent
Grunewald et al.

(10) Patent No.: US 10,057,310 B1
(45) Date of Patent: Aug. 21, 2018

(54) INTERACTIVE SPECTATING INTERFACE FOR LIVE VIDEOS

(71) Applicant: Facebook, Inc., Menlo Park, CA (US)

(72) Inventors: Calvin Patrick Grunewald, Issaquah, WA (US); Stephen Ellis, Redwood City, CA (US); Jakub Pudelek, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/620,712

(22) Filed: Jun. 12, 2017

(51) Int. Cl.
*H04L 29/06* (2006.01)
*H04N 21/482* (2011.01)
*H04N 21/478* (2011.01)
*H04N 21/4788* (2011.01)
*H04N 21/61* (2011.01)

(52) U.S. Cl.
CPC ..... *H04L 65/4069* (2013.01); *H04N 21/4781* (2013.01); *H04N 21/4788* (2013.01); *H04N 21/482* (2013.01); *H04N 21/6125* (2013.01)

(58) Field of Classification Search
CPC ............. H04L 65/4069; H04N 21/482; H04N 21/4781; H04N 21/4788
See application file for complete search history.

(56) References Cited

U.S. PATENT DOCUMENTS 7,603,683 B2 * 10/2009 Reto ................. H04L 29/06027
709/204
2014/0372517 A1 12/2014 Zuili 2015/0121437 A1 4/2015 Tan
2017/0001111 A1 * 1/2017 Willette ................ A63F 13/85
2017/0134738 A1 * 5/2017 Neuman ................ H04N 19/40

FOREIGN PATENT DOCUMENTS

JP 2015-100039 5/2015

OTHER PUBLICATIONS

International Search Report and Written Opinion for International Application PCT/US2017/037181, dated Dec. 26, 2017.

* cited by examiner

*Primary Examiner* — Sumaiya A Chowdhury
(74) *Attorney, Agent, or Firm* — Baker Botts L.L.P.

(57) ABSTRACT

In one embodiment, a method includes a system receiving a first request to publish a live video and a first network address associated with a third-party system. The system may receive a second request for content from a first user device and, in response, transmit display instructions, the first network address associated, a second network address from which the live video is available, and a third network address from which an interface application is available. The display instructions may be configured to cause the first user device to: configure a video player application to display the live video obtained using the second network address; obtain the interface application using the third network address; configure the interface application to be displayed over at least a portion of the live video and to communicate with the third-party computing system using the first network address.

19 Claims, 6 Drawing Sheets

INTERACTIVE SPECTATING INTERFACE FOR LIVE VIDEOS

TECHNICAL FIELD

This disclosure generally relates to a framework allowing developers to develop and deploy interactive interfaces for live content.

BACKGROUND

Users of a social-networking system may publish a live video through the social-networking system. The video content may be sent to the social-networking system from any source, including the user's own mobile device or computer, a third-party application and its server, a third-party streaming service, among others. The social-networking system may publish the live video on a web site or through an application associated with the social-networking system. Other users viewing the live video may post comments relating to the live video on the social-networking platform.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Embodiments disclosed herein relate to systems and methods that enable users of a content-distribution platform (e.g., a social-networking system) to not only passively view live content, but also to actively engage with, e.g., other viewers, the content originator, as well as the content itself. The act of passively viewing or spectating is therefore transformed into an interactive experience. Further, embodiments disclosed herein enable third-party developers to control and customize the interactive experience for their specific live content. In particular embodiments, a social-networking system may provide a framework through which a developer may publish live video and provide an interactive spectating interface. The interactive spectating interface may be overlaid on top of the live video. The interface may contain a transparent portion that allows a user to see the live video underneath. The interface may be custom designed by the developer to communicate with the developer's system and provide interactive features that are tailored for the developer's live video.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Particular embodiments described herein relate to systems and methods that transform a spectating experience into an interactive experience. For example, users of a social-networking system may watch others play games, some of which may be streamed live in real time. Particular embodiments described herein enable a spectators to not only watch games, but also actively engage in the games by, e.g., posting live reactions, sentiments, and/or comments for the current game player and other spectators to see. In addition, the spectator may join a game and play with the game player or another spectator by clicking/tapping on an activation element presented with the streaming content. Triggering the activation element may cause a native gaming app installed on the user's system to launch and automatically establish the necessary connections to join the game. Such examples of interactive spectating features drive engagement between social-networking users around the content (e.g., game) as well as with the game itself, thereby benefiting the end users, the social-networking system, and the game developer.

Systems and methods described with respect to particular embodiments provide a framework for a developer to develop an interactive spectating experience that is tailored for the content streamed by the developer through a social-networking system. By leaving the implementation details of the spectating interface to the developers, the interface could be custom tailored for each individual content being broadcast (e.g., game), rather than being a generic interface provided by the social networking system. For example, the developer's game server may leverage its knowledge of the game state to provide dynamic features for the spectating interface.

Figure 1:
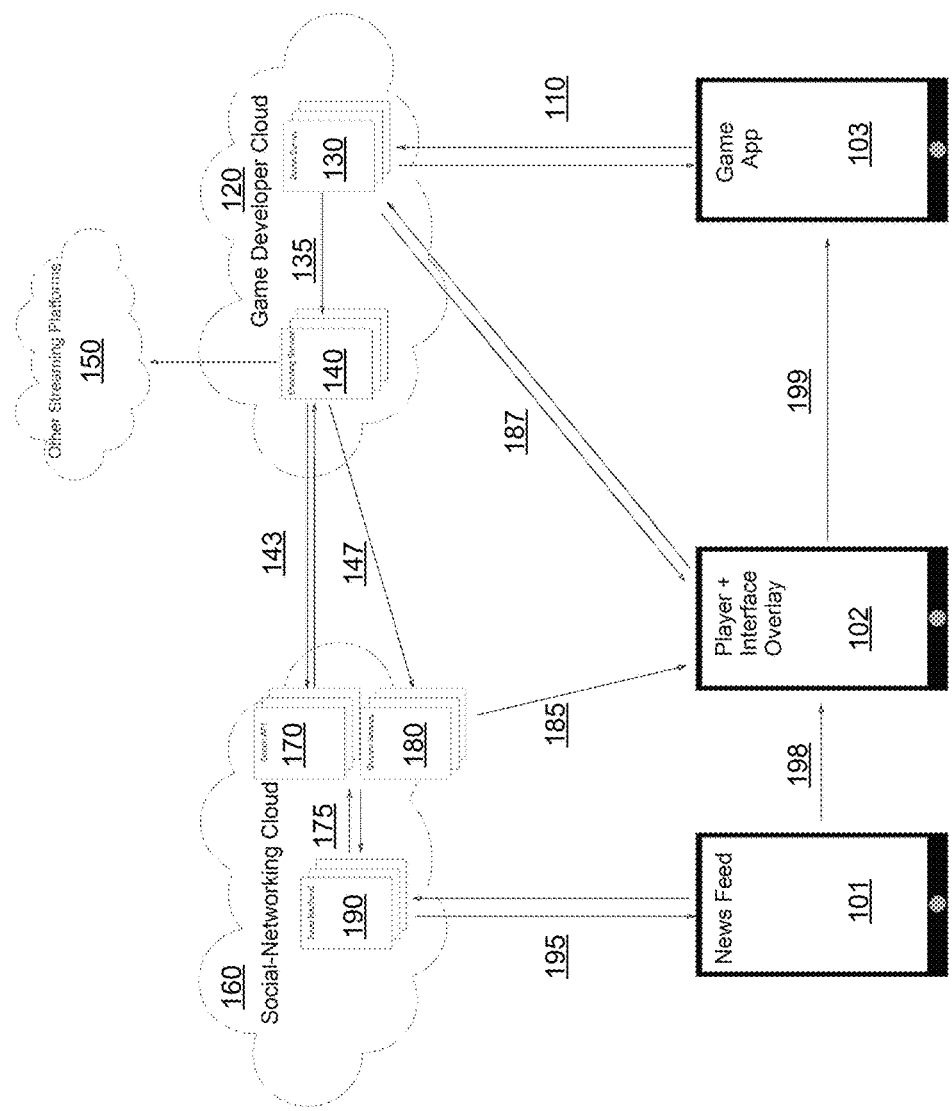
FIG. 1 illustrates an example block diagram for an embodiment where a spectating interface is overlaid over a video player.

FIG. 1 illustrates an example block diagram for an embodiment where an interactive spectating interface is overlaid over a video player. At a high level, for example, a live video may be overlaid with an interactive spectating interface (which may be implemented using, e.g., HTML5). The interface may be designed by a third-party developer (relative to the social-networking system) of an application that is configured to cause live content to be streamed through the social-networking system. In particular embodiments, the interface may be uploaded to the social-networking system. In particular embodiments, the interface may comprise a transparent portion that allows the underlying content to be visible. The interface may also comprise any control and display elements for supporting the developer's spectating interface design. Through the interface, a spectator may be able to provide input to and receive updates from a system associated with the third-party developer (e.g., a game server associated with a game developer). For example, since a game server may know and have control over the game state/features, the game server would be able to provide interactive opportunities and/or feedback based on the game state/features. An example of the system infrastructure for enabling a third-party developer to design and deploy such an interactive spectating overlay is shown in FIG. 1.

In particular embodiments, the systems and processes shown in FIG. 1 may be used to provide live broadcasts of games with an interactive spectating interface. It should be appreciated that although this example embodiment is described in the gaming context, this disclosure contemplates integrating an interactive spectating interface with any suitable content, such as a video/audio broadcast. In particular embodiments, a user or game player may be playing a native gaming app 103 on his/her mobile device. The player may log into the game 103, which may communicate with a corresponding game server 130 associated the game's developer. In particular embodiments, the player may also authenticated himself with a social-networking system. When the player wishes to broadcast his live game play through the social-networking system, his device may, in particular embodiments, communicate 110 with the game server 130 and transmit a stream key, player access token, and/or a broadcast permission/target, each of which may be used by the game server 130 to request the social-networking system to broadcast the live game play. The stream key may represent an identification or reference to the streaming session of the game that is being played. The player access token may be a token that authenticates and identifies the player on the social-networking system. For example, the player access token may be generated in response to the player successfully authenticating himself with the social-networking system. The authentication may occur in any conventional manner, such as the player logging into the social-networking system when launching the game. The broadcast permission/target, which may eventually passed to the social-networking system, may inform the social-networking system of the desired permissions and or targets for the live streaming of the game. For example, a permission may restrict potential spectators to those who are within a particular group or within a threshold degree of separation from 16 the player in the social-networking system. As another example, a target may specify which users or types of users may be shown the live content.

The game 103 and the game server 130 may also communicate 110 during a game. For example, the game 103 may transmit game control packets to the game server 130 during game play. This may include, e.g., user commands, purchases, game state, and other game-related data. The game server 130 may also transmit, e.g., server-side game states, instructions, and advertisements to the game 103. For example, certain game state may be determined by the server, and such game state may be communicated to the gaming application 103 during a game. As another example, the game server 130 may send the player community game updates, which may relate to game states and/or commands from other players who are playing a game with the player.

As discussed above, the player's game play may be broadcast live through a social-networking system. In particular embodiments, the live broadcast request may be transmitted from the game developer's cloud 120 to the social-networking cloud 160. In particular embodiments, the game developer's cloud 120 may comprise the game server 130 and an encoding service 140 that is configured to generate and/or encode videos of the player's game play for distribution to the social-networking cloud 160. In particular embodiments, the game developer's cloud 120 may establish a streaming session with the social-networking system by submitting a live video request. The live video request may be transmitted from, e.g., the encoding service 140 or the game server 130. In an embodiment where the encoding service 140 is configured to interface with the social-networking cloud 160, the game server 130 may pass 135 a game server URI to the encoding service 140. As will be described in more detail below, this game server URI may subsequently be used by the interactive spectating interface to communicate directly with the game server 130. In particular embodiments, the game server 130 may also pass 135 the player's player access token and/or the broadcast permission/target information to the encoding service 140. The player access token may be used to show the social-networking cloud 160 who the player is and that he is authorized to publish content through his account with the social-networking system. The broadcast permission/target may also be part of the request 143 to inform the social-networking cloud 160 of the desired audience of the live video. In particular embodiments, the game server 130 may also send the stream key to the encoding service 140. The stream key may be used by the encoding service 140 to identify a particular streaming session that is established with the social-networking cloud 160 for streaming the live video. For example, as the game server 130 generates new content, the content may be sent 135 to the encoding service 140 with the appropriate stream key to inform the encoding service 140 of which stream to use.

In particular embodiments, the game developer cloud 120 may request the social-networking cloud 160 to publish a live video. The social-networking cloud 160 may comprise a graph API 170 and a stream service 180. The graph API 170 may be configured to handle live video requests and respond by generating a live video object and insert it into a social graph maintained by the social-networking system. The stream service 180 may be configured to receive and distribute live video. In particular embodiments, the live video creation request may be sent to the graph API 170. In particular embodiments, the live video request 143 may be accompanied with the player access token and/or the broadcast permission/target, as discussed above. In particular embodiments, the request may also include user identifiers within the social-networking system that identify the player and/or any other players who are playing the game with the player. The user identifier(s) may be used by the social-networking system to determine where to publish the requested live video (e.g., news feeds associated with the player and/or his friends), for example. In particular embodiments, the request 143 may also include story attribution data, which may include any metadata that may be used to generate a social-media story for the live video. For example, the story attribution data may include information relating to the current game state (e.g., the player is fighting a particular boss in the game), how long the player has been playing, the player's score, the player's opponents, and any other information that may be helpful in generating textual context for the live video. In particular embodiments, the request 143 may include the game server's URI or connection address (e.g., web socket), as discussed above. In particular embodiments, the request 143 may further include landscape/portrait crop rules, which may be used by the social-networking system to determine how the live video should be cropped when being displayed in different viewing orientations. In particular embodiments, the request 143 may also include a deeplink generated by the game developer cloud 120. As will be described in more detail below, the deeplink may be used by the spectating interface to launch the appropriate gaming application on the user's device and provide the gaming application with instructional data to automatically perform certain actions (e.g., starting a gaming session with the game server).

In particular embodiments, the graph API 170 may receive the live video request and, in response, generate and inject a live video object in the social graph. In particular embodiments, the live video object may be associated with objects in the social graph that are associated with the player and/or other players who are playing the game. In particular embodiments, the graph API 170 may send 143 back a reference to the live video object to the game developer cloud 120 (e.g., the encoding service 140 of the cloud 120). The live video object may include an RTMP (Real-Time Messaging Protocol) URI to which video frames may be pushed (any content source may push video frames to this URI, including a streaming service, a user's phone, etc.). In particular embodiments, the RTMP URI may point to the stream service 180 of the social-networking cloud 160. The stream service 180 may accumulate the received frames and transmit a live video upon request.

Particular embodiments of the live video streaming flow may be as follows. As a game is being played, the game server 130 may simulate the game and render the corresponding frames and provide 135 them to the encoding service 140 for distribution. In particular embodiments, a stream key may be sent with the video frames to inform the encoding service 140 of the stream to which the video frames belong. The encoding service 140 may then transmit 147 the video frames to the stream service 180 of the social-networking system using the RTMP RUI that is associated with the live video object associated with the live video. In particular embodiments, the encoding service may utilize any streaming service 150 (which may be a third-party service external to the game developer system) to distribute the video stream to the social-networking cloud 160. The video frames may be accumulated by the stream service 180, and upon request may distribute the frames.

In particular embodiments, the social-networking system may publish the live video in news feed. In particular embodiments, the social-networking cloud 160 may comprise a feed backend server 190. The feed backend server 190 may communicate 175 with the graph API 170 and/or the stream service 180 to obtain story data. The story data, which may include the aforementioned story attribution data, may be used to generate a story for the live content in a news feed. In particular embodiments, the feed backend server 190 may receive a feed request 195 from a user device configured to display news feeds 101. For example, the user of the device may be logged into the social-networking system through an associated app or browser. The feed backend server 190 may identify the requesting user and determine what news feed to provide. In particular embodiments, the server 190 may use the social graph to determine that the requesting user's news feed should include the live video associated with the live video object that was created (e.g., the requesting user may be within a threshold degree of separation, such as 1, from the player who is publishing the live video). In particular embodiments, the feed backend server 190 may also consider the broadcast permission/target instructions to determine whether or not the live video should be shown to the requesting user. If the server 190 determines that the live video should be shown, it may transmit 195 one or more of the following data. In particular embodiments, the server 190 may transmit 195 one or more feed stories, one of which may be a story generated using the story attribution data to provide context and/or to market the live video. In particular embodiments, the story may include one or more video frames associated with the live video. In particular embodiments, the live video (without an interactive spectating interface) may be streamed through the news feeds as part of the story. In particular embodiments, the live video presented in the news feed may be overlaid with an interactive spectating interface, as will be described in more detail below. In particular embodiments, the server 190 may transmit a video stream URI from which to download the live video or a preview of the live video (e.g., one or more frames), a game server URI as described above, and/or an instant overlay URI from which to download the interactive spectating interface. In particular embodiments, the interactive spectating interface may be implemented using HTML5 and/or JavaScript and packaged in a zip file. The interactive spectating interface may be designed and implemented by the game developer and uploaded to a server associated with the social-networking system. Through the instant overlay URI, the particular interactive spectating interface for the game may be downloaded. In particular embodiments, the social-networking system may determine which instant overlay URI to provide based on information provided with the live video creation request (e.g., the request may specify an identifier assigned to the instant overlay or any other information, such as the deeplink or game ID, that may be mapped to the particular instant overlay).

In particular embodiments, the server 190 may transmit 195 display instructions (e.g., in HTML) that specify how the transmitted information should be configured in the user's news feed 101. In particular embodiments, the story associated with the live video may be configured to handle an activation input. Upon receiving such an activation input 198 (e.g., user clicking or tapping on the story or live video), the news feed 101 may transition into a mode 102 where the live video is presented with an interactive spectating interface. In particular embodiments, the live video stream may be loaded and started in a video player (e.g., using the video stream URI to download 185 the video from the stream service 180). In particular embodiments, the video player may be displayed within the social networking platform (e.g., within the news feed, in a separate window/interface stemming from the news feed, within an associated chat interface/messenger, etc.). In particular embodiments, the social-networking cloud 160 (e.g., through the stream service 180) may also send 185 to the user device commands and/or reaction data posted by users in response to the live video.

In particular embodiments, instructions provided by the server 190 may also cause the client device to download a package (e.g., zip file) containing the interactive spectating interface (e.g., HTML5, JavaScript, and image assets) using the instant overlay URI. The spectating interface may then be loaded and started using the downloaded package. In particular embodiments, the spectating interface may run as an HTML5 app in web view, with injected JavaScript SDK that allows the HTML5 app to talk to the surrounding app (e.g., an app associated with the social-networking system) and take advantage of the social context in which the HTML5 is embedded. In particular embodiments, the third-party game server URI may be injected into the interactive spectating interface to allow it to communicate 187 with the game server. Through this link 187, the spectator's reactions, comments, and/or commands that are input through the spectating interface may be sent to and processed by the game server 130. Comments and/or reactions, for example, may be shared with others (e.g., the game player and other spectators) through the game server 130. In particular embodiments, developer-defined interactions packets may be sent from the interactive spectating interface 102 to the game server 130 for processing. The game server may process the received packets in any manner it chooses. For example, the packets, which may be sent in response to inputs made by the spectator, may be configured to influence the actual game play and/or trigger any ancillary actions (e.g., gifting, commenting, issuing a challenge, etc.). Thus, not only may the spectator input reactions and/or comments to the streamed content, it may also influence the content and communicate with the originator (e.g., player) of the content. This is made possible in part because the game server 130 has knowledge of and has control over the game state. The game server 130 may also send 187 the spectating interface 102 instructions (e.g., developer-defined interaction opportunities, which may depend on the current game state) and/or data to display. Since the spectating interface is designed by the game developer, it would be configured to handle the game server's 130 instructions appropriately.

Through the embodiments described above, a spectator of a live video may be provided with an interactive spectating experience. Live video content (e.g., of the game) may be streamed through the video player, which may be overlaid (e.g., fully or partially covered) with an interactive spectating interface capable of receiving input from the spectator and sending/receiving data and instructions to the game server 130. In particular embodiments, the interactive spectating interface 102 may be a custom HTML5 app developed by the game developer, and may be configured to connect to the third-party game server 130 endpoint and take directions on what actions to perform. In particular embodiments, the interactive spectating interface may implement (via an SDK provide by the social-networking system) certain common features. For instance, each interactive spectating interface may support a swipe-left feature that allows comments and reaction to be displayed over the video.

In particular embodiments, the interactive spectating interface may be configured to support a deeplink activation. In particular embodiments, the deeplink provided by the game server 130 to the social-networking system may be integrated into the spectating interface. For example, the display instructions sent from the feed backend server 190 to the user device may configure a handler for receiving a deeplink activation input from the spectator. Upon activating 199 the deeplink, the deeplink may attempt to launch the appropriate app (e.g., the game that is being streamed in the live video) installed on the spectator's device. If the app is unavailable, the spectator may be redirected to an app store or source from which the app may be downloaded. While in the description above the gaming app 103 represented the device of the player and the content source of the live video being streamed, the gaming app 103 in the present context represents the spectator's device activating the native gaming app. The game developer may design the deeplink to include any information (e.g., app scheme that the developer registered, a game session ID associated with the game that was streamed in the live video, instructions, etc.) and to trigger any type of action within the developer's gaming app 103. For example, activating the deeplink may launch the app and instruction the app to automatically queue the spectator to join a game (tournament or match) with the player and/or other spectators (e.g., to play the winner of the last game) based on the type of game being streamed. As another example, the spectator provide in-game gifting directly through the deeplink. It should be appreciated that the game developer is provided with the flexibility to implement the specific actions that may be performed. Through the deeplink, a spectator may interact with a game developer through the developer's native gaming app.

Figure 2:
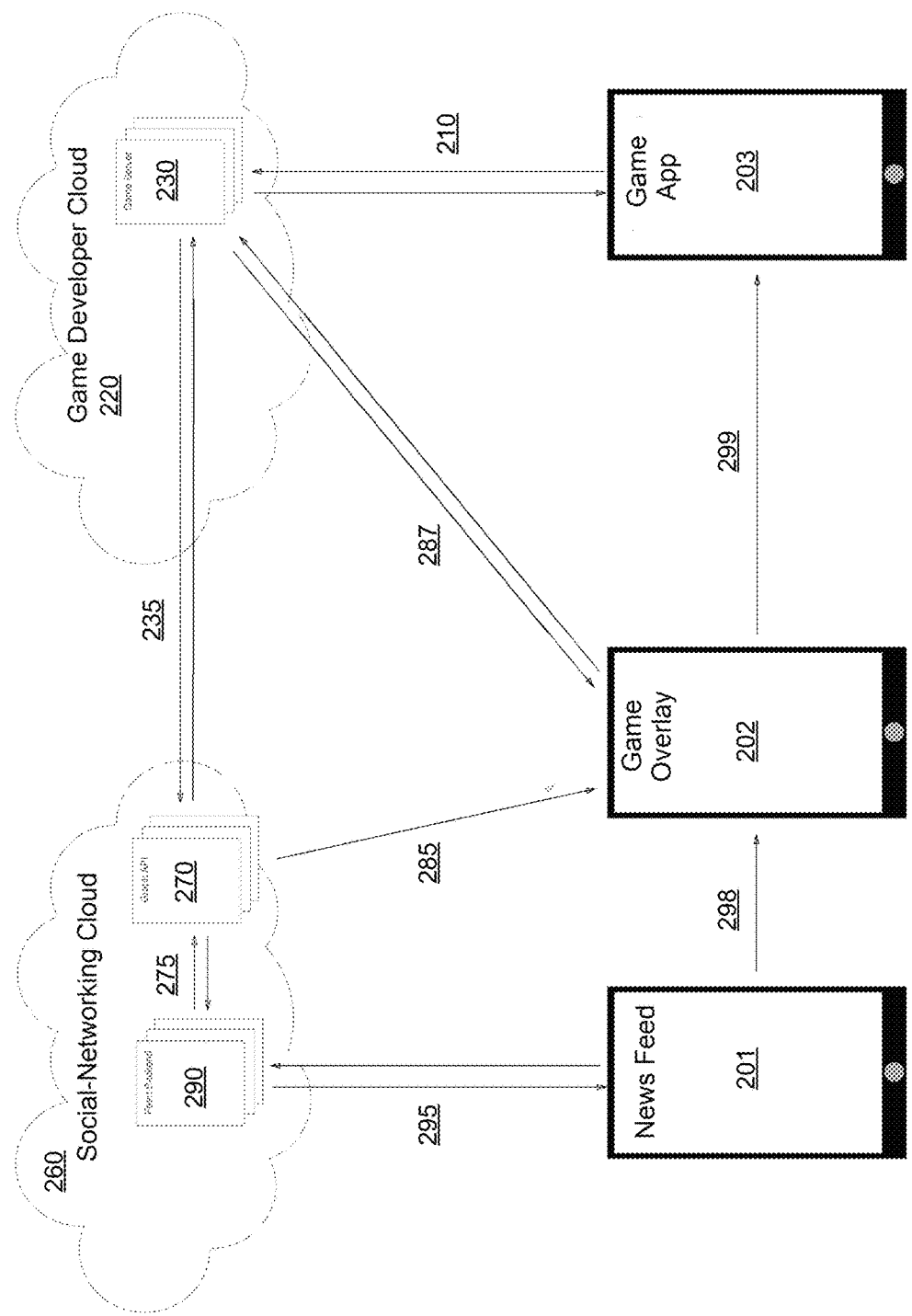
FIG. 2 illustrates an example block diagram for an embodiment where a spectating interface is configured to render live content.

FIG. 2 illustrates an example block diagram for an embodiment where a spectating interface is configured to render live content (e.g., live gaming). In the embodiment shown, only an HTML5 app 202 would be running on the spectator's device without utilizing a video player. Instead of streaming a live video through a player, the live game play may be rendered by the HTML5 app 202 on the spectator's device based on game state data sent by the game server 230. Aside from re-creating the game for the spectator, the HTML5 app 202 may include any spectating interface features. The spectating interface may communicate directly with the game server 230 as described above with respect to FIG. 1. Since no video is involved, video processing and delivery is no longer needed, which may be desirable for efficiency reasons.

In particular embodiments, in the process illustrated in FIG. 2, similar to that of FIG. 1, a game app 203 on a player's device may communicate 210 with a game developer cloud 220, which may comprise a game server 230. The game app 203 may similarly (1) transmit player access tokens, broadcast permission/target rules, and/or game control packets, and (2) receive server game updates and communicate game updates. However, since no video streaming is performed in the embodiment shown in FIG. 2, a stream key may not be transmitted in particular embodiments. For the same reason, the game developer cloud 220 may not utilize an encoding service and/or other streaming platforms since no video is broadcast. In addition, in particular embodiments the game server 230 may no longer simulates the game and render the corresponding video frames for distribution.

In particular embodiments, the game developer cloud 220 (e.g., through the game server 230) may request the social-networking cloud 260 to create a game story. In particular embodiments, the game developer cloud 220 may provide the player access tokens to the social-networking system to authenticate the player, and request the system to adhere to the broadcast permission/target rules. Similar to the process described with respect to FIG. 1, the game server 230 may communicate 235 with a graph API 270 associated with the social-networking cloud 260 to submit the request. In particular embodiments, the request may include information such as user identifiers, story attribution, game server URI or connection address, deeplink, and/or landscape/portrait crop rules, similar to those described with respect to FIG. 1. In particular embodiments, the game server 230 may in addition transmit 235 art assets, which may be used by the social-networking system to generate a story. In particular embodiments, the graph API 270 may create a game story object based on the information received and insert the object into a social graph maintained by the social-networking system. In particular embodiments, the game story object may be associated with the player and/or others players engaging in the same game.

In particular embodiments, a feed backend server 290 may obtain 275 story data from the graph API 270 to create a game story. In a manner similarly described with respect to FIG. 1, the feed backend server 290 may respond to feed requests 295 from a spectator's device running a news feed application 201 and return feed stories. One of the feed stories may be an overlay-enabled game story, generated using the story attributes from the game developer cloud 220. In addition, the server 290 may transmit an instant overlay URI from which an interactive spectating interface may be downloaded and a game server URI. The overlay-enabled game story may be configured to render a snapshot or short movie of the game in progress based on game state data provided by the game developer cloud 220.

In particular embodiments, instructions from the feed backend server 290 may configure the game story to handle an activation event that, upon triggering 298, may load and start an interactive spectating interface 202. In particular embodiments, the interactive spectating interface 202 (e.g., HTML5/JavaScript package developed and uploaded by the game developer) may be downloaded using the instant overlay URI provided by the feed backend server 290. In particular embodiments, the interactive spectating interface 202 may be injected with the game server URI, which may be used to communicate 287 with the game server 230. In particular embodiments, the interactive spectating interface 202 may transmit developer-defined interaction packets, which may be processed by the game server 230 to perform any actions. In particular embodiments, the game server 230 may send to the interface 202 developer-defined interaction opportunities and game state, including server game updates and/or community game updates, as described above. The interactive spectating interface 202 may be configured by the game developer to render the game based on the game state received. Thus, rather than using a video player to play a video of the game, the embodiment shown in FIG. 2 uses the interface app 202 to recreate the gaming scenes. Similar to the interactive spectating interface described with respect to FIG. 1, the interface 202 may also be configured to handle spectating features, such as allowing the spectator to input a reaction/comment to the game, as well as any other developer-defined interaction opportunities based on the game state. In particular embodiments, the interface 202 may also receive 285 comment and reaction data from the social-networking cloud 260.

Similar to the deeplink feature described with respect to FIG. 1, the embodiment shown in FIG. 2 may also support the deeplink feature. For instance, the interactive spectating interface 202 may be configured to handle a deeplink activation. Upon receiving an activation event 299, the interactive spectating interface 202 may launch an app 203 (e.g., the gaming app) referenced by the deeplink and automatically perform any action encoded in the deeplink, as described above.

Figure 3:
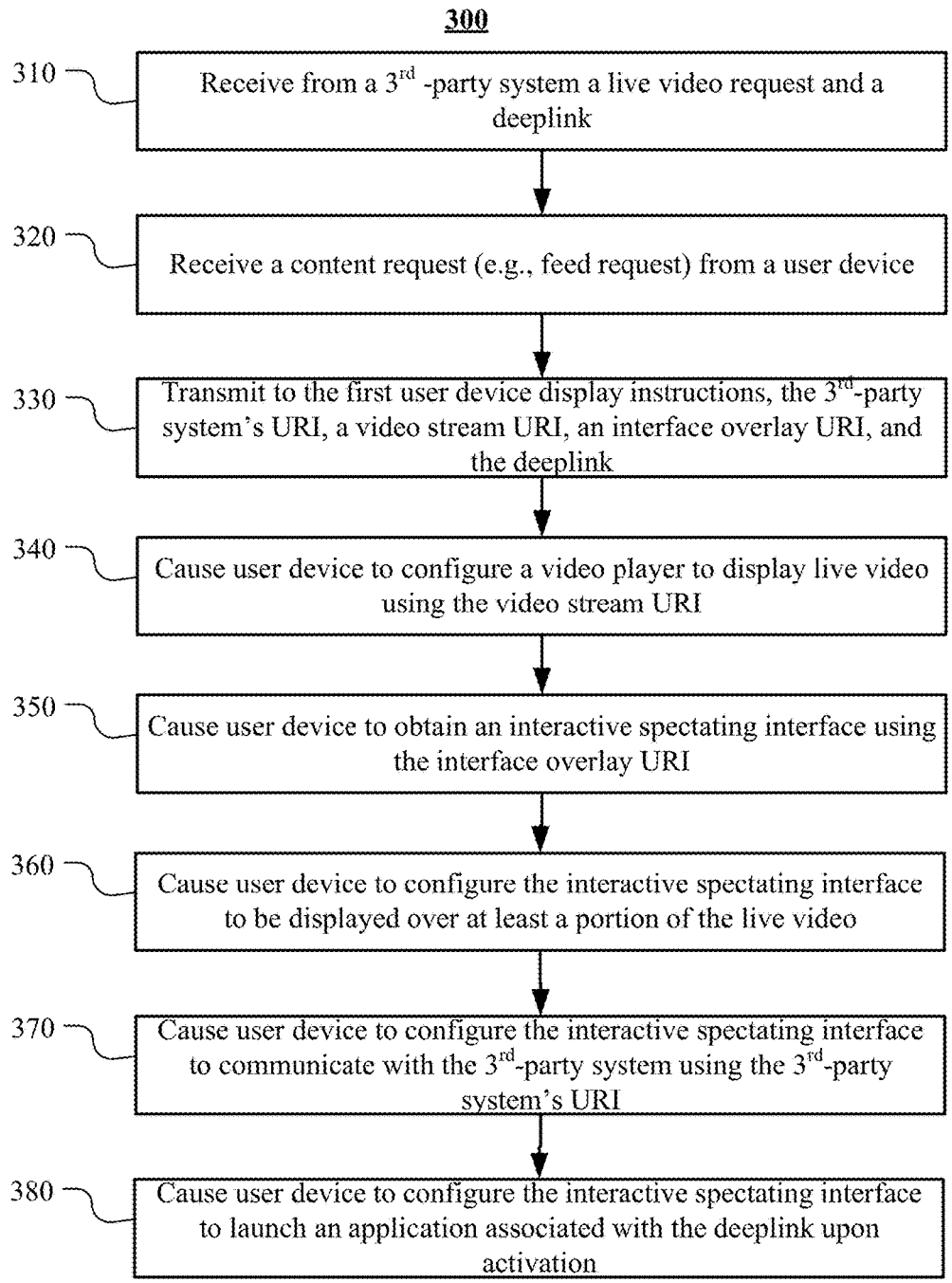
FIG. 3 illustrates an example flow diagram for providing an interactive spectating interface.

FIG. 3 illustrates an example method 300 for providing an interactive spectating interface. The method may begin at step 310, where a computing system associated with a social network may receive a first request to publish a live video. In particular embodiments, a deeplink may also be received. The first request may be received from a third-party computing system relative to the social network, and the first request may comprise a first network address associated with the third-party computing system. At 320, the computing system may receive a second request for content from a first user device associated with a first user. At 330, the computing system, in response to the second request, may transmit to the first user device display instructions, the first network address associated with the third-party computing system, a second network address from which the live video is available, and a third network address from which an interface application is available. In particular embodiments, the computing system may also transmit the deeplink. At step 340, the display instructions may be configured to cause the first user device to configure a video player application to display the live video obtained using the second network address. At step 350, the user device may also be caused to obtain the interface application using the third network address. At step 360, the user device may be caused to configure the interface application to be displayed over at least a portion of the live video. At step 370, the user device may be caused to configure the interface application to communicate with the third-party computing system using the first network address. At 380, the user device may be caused to be configured to receive an input activating the deeplink and, in response to the input, launch the application installed on the first user device associated with the deeplink. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for providing an interactive spectating interface including the particular steps of the method of FIG. 3, this disclosure contemplates any suitable method for providing an interactive spectating interface, including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
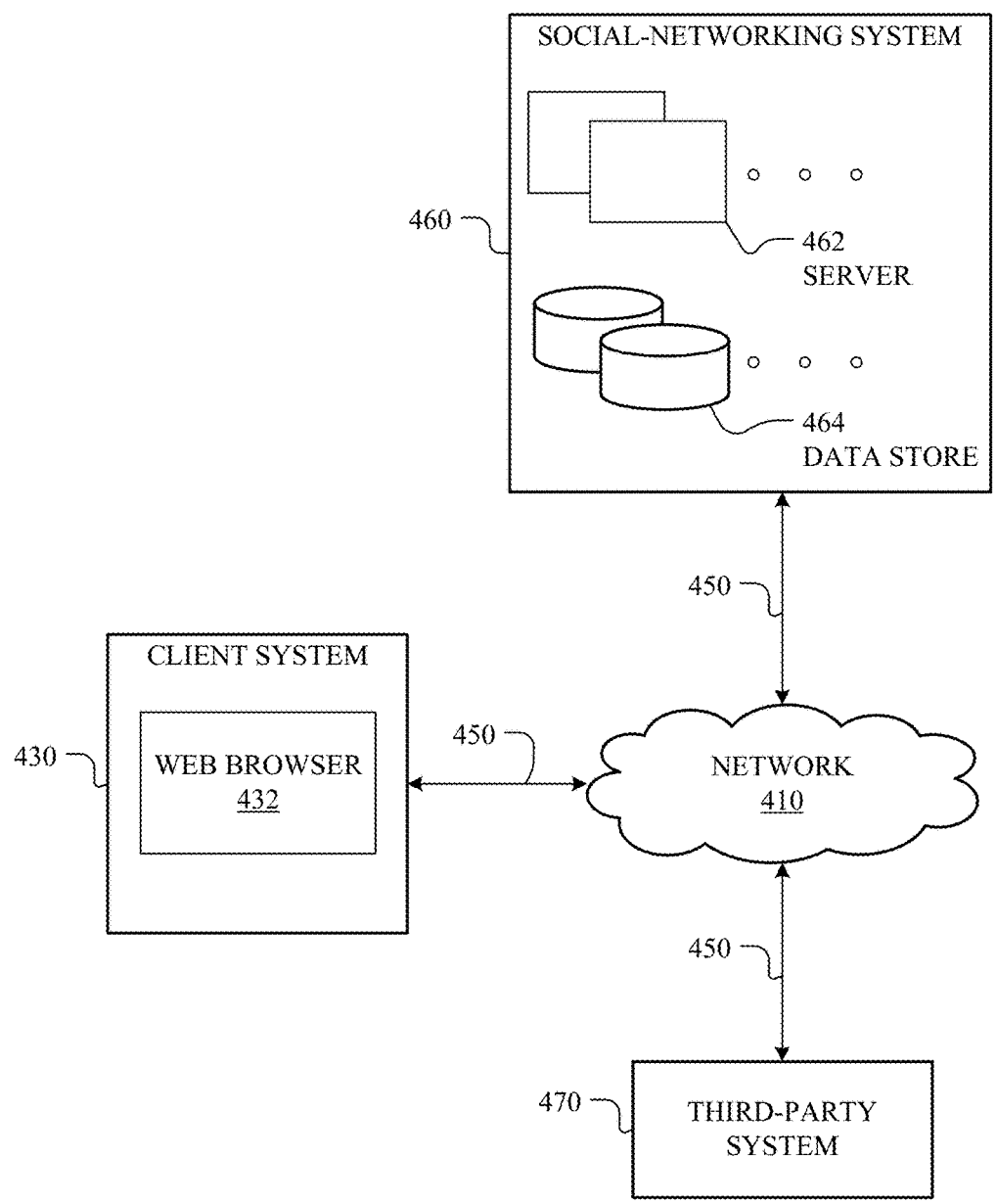
FIG. 4 illustrates an example network environment associated with a social-networking system.

FIG. 4 illustrates an example network environment 400 associated with a social-networking system. Network environment 400 includes a client system 430, a social-networking system 460, and a third-party system 470 connected to each other by a network 410. Although FIG. 4 illustrates a particular arrangement of client system 430, social-networking system 460, third-party system 470, and network 410, this disclosure contemplates any suitable arrangement of client system 430, social-networking system 460, third-party system 470, and network 410. As an example and not by way of limitation, two or more of client system 430, social-networking system 460, and third-party system 470 may be connected to each other directly, bypassing network 410. As another example, two or more of client system 430, social-networking system 460, and third-party system 470 may be physically or logically co-located with each other in whole or in part. Moreover, although FIG. 4 illustrates a particular number of client systems 430, social-networking systems 460, third-party systems 470, and networks 410, this disclosure contemplates any suitable number of client systems 430, social-networking systems 460, third-party systems 470, and networks 410. As an example and not by way of limitation, network environment 400 may include multiple client system 430, social-networking systems 460, third-party systems 470, and networks 410.

This disclosure contemplates any suitable network 410. As an example and not by way of limitation, one or more portions of network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 410 may include one or more networks 410.

Links 450 may connect client system 430, social-networking system 460, and third-party system 470 to communication network 410 or to each other. This disclosure contemplates any suitable links 450. In particular embodiments, one or more links 450 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout network environment 400. One or more first links 450 may differ in one or more respects from one or more second links 450.

In particular embodiments, client system 430 may be an electronic device including hardware, software, or embedded logic components or a combination of two or more such components and capable of carrying out the appropriate functionalities implemented or supported by client system 430. As an example and not by way of limitation, a client system 430 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 430. A client system 430 may enable a network user at client system 430 to access network 410. A client system 430 may enable its user to communicate with other users at other client systems 430.

In particular embodiments, client system 430 may include a web browser 432, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 430 may enter a Uniform Resource Locator (URL) or other address directing the web browser 432 to a particular server (such as server 462, or a server associated with a third-party system 470), and the web browser 432 may generate a Hyper Text Transfer Protocol (HTTP) request and communicate the HTTP request to server. The server may accept the HTTP request and communicate to client system 430 one or more Hyper Text Markup Language (HTML) files responsive to the HTTP request. Client system 430 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 460 may be a network-addressable computing system that can host an online social network. Social-networking system 460 may generate, store, receive, and send social-networking data, such as, for example, user-profile data, concept-profile data, social-graph information, or other suitable data related to the online social network. Social-networking system 460 may be accessed by the other components of network environment 400 either directly or via network 410. As an example and not by way of limitation, client system 430 may access social-networking system 460 using a web browser 432, or a native application associated with social-networking system 460 (e.g., a mobile social-networking application, a messaging application, another suitable application, or any combination thereof) either directly or via network 410. In particular embodiments, social-networking system 460 may include one or more servers 462. Each server 462 may be a unitary server or a distributed server spanning multiple computers or multiple datacenters. Servers 462 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 462 may include hardware, software, or embedded logic components or a combination of two or more such components for carrying out the appropriate functionalities implemented or supported by server 462. In particular embodiments, social-networking system 460 may include one or more data stores 464. Data stores 464 may be used to store various types of information. In particular embodiments, the information stored in data stores 464 may be organized according to specific data structures. In particular embodiments, each data store 464 may be a relational, columnar, correlation, or other suitable database. Although this disclosure describes or illustrates particular types of databases, this disclosure contemplates any suitable types of databases. Particular embodiments may provide interfaces that enable a client system 430, a social-networking system 460, or a third-party system 470 to manage, retrieve, modify, add, or delete, the information stored in data store 464.

In particular embodiments, social-networking system 460 may store one or more social graphs in one or more data stores 464. In particular embodiments, a social graph may include multiple nodes—which may include multiple user nodes (each corresponding to a particular user) or multiple concept nodes (each corresponding to a particular concept)—and multiple edges connecting the nodes. Social-networking system 460 may provide users of the online social network the ability to communicate and interact with other users. In particular embodiments, users may join the online social network via social-networking system 460 and then add connections (e.g., relationships) to a number of other users of social-networking system 460 to whom they want to be connected. Herein, the term "friend" may refer to any other user of social-networking system 460 with whom a user has formed a connection, association, or relationship via social-networking system 460.

In particular embodiments, social-networking system 460 may provide users with the ability to take actions on various types of items or objects, supported by social-networking system 460. As an example and not by way of limitation, the items and objects may include groups or social networks to which users of social-networking system 460 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 460 or by an external system of third-party system 470, which is separate from social-networking system 460 and coupled to social-networking system 460 via a network 410.

In particular embodiments, social-networking system 460 may be capable of linking a variety of entities. As an example and not by way of limitation, social-networking system 460 may enable users to interact with each other as well as receive content from third-party systems 470 or other entities, or to allow users to interact with these entities through an application programming interfaces (API) or other communication channels.

In particular embodiments, a third-party system 470 may include one or more types of servers, one or more data stores, one or more interfaces, including but not limited to APIs, one or more web services, one or more content sources, one or more networks, or any other suitable components, e.g., that servers may communicate with. A third-party system 470 may be operated by a different entity from an entity operating social-networking system 460. In particular embodiments, however, social-networking system 460 and third-party systems 470 may operate in conjunction with each other to provide social-networking services to users of social-networking system 460 or third-party systems 470. In this sense, social-networking system 460 may provide a platform, or backbone, which other systems, such as third-party systems 470, may use to provide social-networking services and functionality to users across the Internet.

In particular embodiments, a third-party system 470 may include a third-party content object provider. A third-party content object provider may include one or more sources of content objects, which may be communicated to a client system 430. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 460 also includes user-generated content objects, which may enhance a user's interactions with social-networking system 460. User-generated content may include anything a user can add, upload, send, or "post" to social-networking system 460. As an example and not by way of limitation, a user communicates posts to social-networking system 460 from a client system 430. Posts may include data such as status updates or other textual data, location information, photos, videos, links, music or other similar data or media. Content may also be added to social-networking system 460 by a third-party through a "communication channel," such as a newsfeed or stream.

In particular embodiments, social-networking system 460 may include a variety of servers, sub-systems, programs, modules, logs, and data stores. In particular embodiments, social-networking system 460 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 460 may also include suitable components such as network interfaces, security mechanisms, load balancers, failover servers, management-and-network-operations consoles, other suitable components, or any suitable combination thereof. In particular embodiments, social-networking system 460 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 460 to one or more client systems 430 or one or more third-party system 470 via network 410. The web server may include a mail server or other messaging functionality for receiving and routing messages between social-networking system 460 and one or more client systems 430. An API-request server may allow a third-party system 470 to access information from social-networking system 460 by calling one or more APIs. An action logger may be used to receive communications from a web server about a user's actions on or off social-networking system 460. In conjunction with the action log, a third-party-content-object log may be maintained of user exposures to third-party-content objects. A notification controller may provide information regarding content objects to a client system 430. Information may be pushed to a client system 430 as notifications, or information may be pulled from client system 430 responsive to a request received from client system 430. Authorization servers may be used to enforce one or more privacy settings of the users of social-networking system 460. A privacy setting of a user determines how particular information associated with a user can be shared. The authorization server may allow users to opt in to or opt out of having their actions logged by social-networking system 460 or shared with other systems (e.g., third-party system 470), such as, for example, by setting appropriate privacy settings. Third-party-content-object stores may be used to store content objects received from third parties, such as a third-party system 470. Location stores may be used for storing location information received from client systems 430 associated with users. Advertisement-pricing modules may combine social information, the current time, location information, or other suitable information to provide relevant advertisements, in the form of notifications, to a user.

Figure 5:
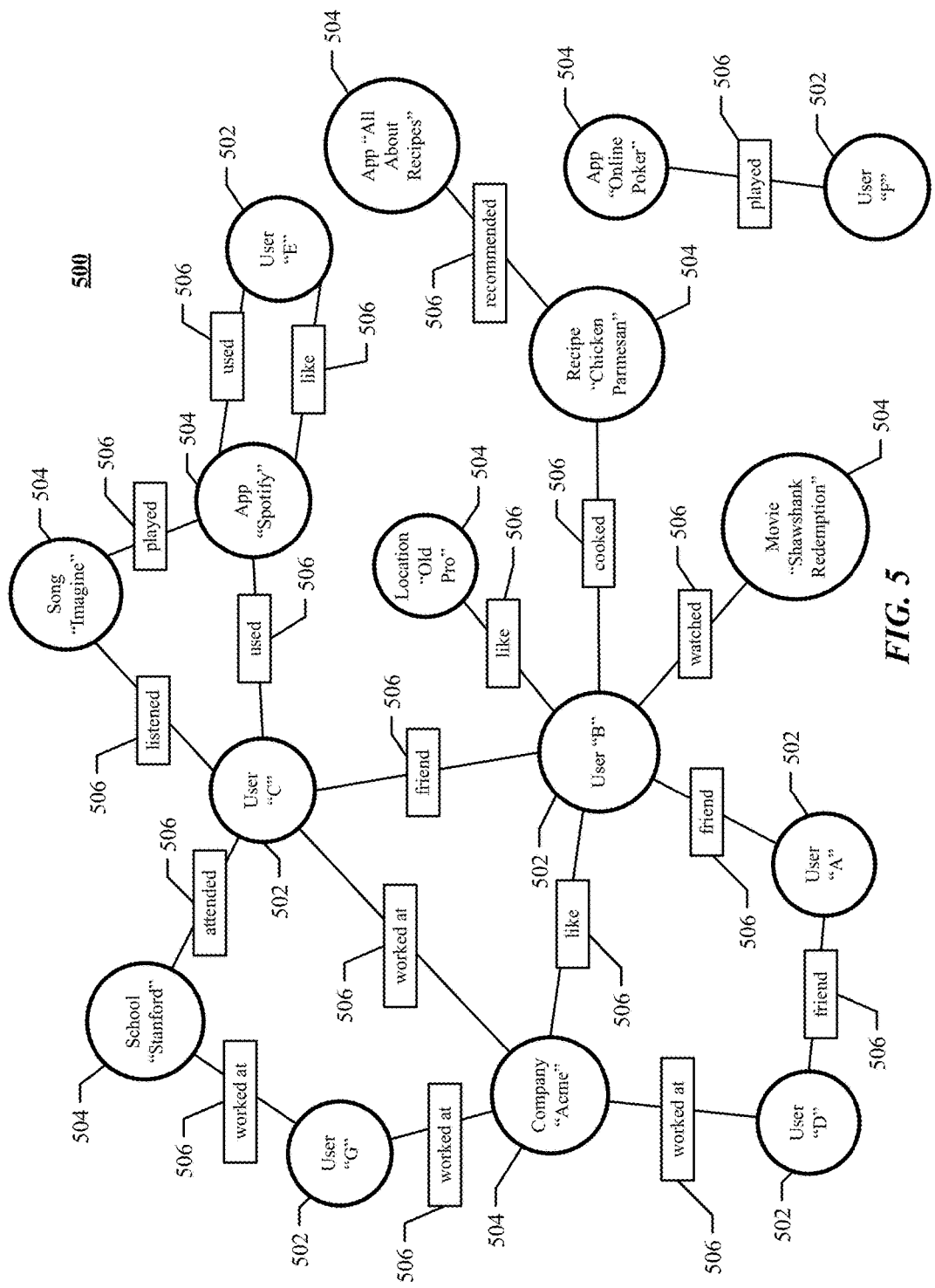
FIG. 5 illustrates an example social graph.

FIG. 5 illustrates example social graph 500. In particular embodiments, social-networking system 460 may store one or more social graphs 500 in one or more data stores. In particular embodiments, social graph 500 may include multiple nodes—which may include multiple user nodes 502 or multiple concept nodes 504—and multiple edges 506 connecting the nodes. Example social graph 500 illustrated in FIG. 5 is shown, for didactic purposes, in a two-dimensional visual map representation. In particular embodiments, a social-networking system 460, client system 430, or third-party system 470 may access social graph 500 and related social-graph information for suitable applications. The nodes and edges of social graph 500 may be stored as data objects, for example, in a data store (such as a social-graph database). Such a data store may include one or more searchable or queryable indexes of nodes or edges of social graph 500.

In particular embodiments, a user node 502 may correspond to a user of social-networking system 460. As an example and not by way of limitation, a user may be an individual (human user), an entity (e.g., an enterprise, business, or third-party application), or a group (e.g., of individuals or entities) that interacts or communicates with or over social-networking system 460. In particular embodiments, when a user registers for an account with social-networking system 460, social-networking system 460 may create a user node 502 corresponding to the user, and store the user node 502 in one or more data stores. Users and user nodes 502 described herein may, where appropriate, refer to registered users and user nodes 502 associated with registered users. In addition or as an alternative, users and user nodes 502 described herein may, where appropriate, refer to users that have not registered with social-networking system 460. In particular embodiments, a user node 502 may be associated with information provided by a user or information gathered by various systems, including social-networking system 460. As an example and not by way of limitation, a user may provide his or her name, profile picture, contact information, birth date, sex, marital status, family status, employment, education background, preferences, interests, or other demographic information. In particular embodiments, a user node 502 may be associated with one or more data objects corresponding to information associated with a user. In particular embodiments, a user node 502 may correspond to one or more webpages.

In particular embodiments, a concept node 504 may correspond to a concept. As an example and not by way of limitation, a concept may correspond to a place (such as, for example, a movie theater, restaurant, landmark, or city); a website (such as, for example, a website associated with social-network system 460 or a third-party website associated with a web-application server); an entity (such as, for example, a person, business, group, sports team, or celebrity); a resource (such as, for example, an audio file, video file, digital photo, text file, structured document, or application) which may be located within social-networking system 460 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 504 may be associated with information of a concept provided by a user or information gathered by various systems, including social-networking system 460. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 504 may be associated with one or more data objects corresponding to information associated with concept node 504. In particular embodiments, a concept node 504 may correspond to one or more webpages.

In particular embodiments, a node in social graph 500 may represent or be represented by a webpage (which may be referred to as a "profile page"). Profile pages may be hosted by or accessible to social-networking system 460. Profile pages may also be hosted on third-party websites associated with a third-party system 470. As an example and not by way of limitation, a profile page corresponding to a particular external webpage may be the particular external webpage and the profile page may correspond to a particular concept node 504. Profile pages may be viewable by all or a selected subset of other users. As an example and not by way of limitation, a user node 502 may have a corresponding user-profile page in which the corresponding user may add content, make declarations, or otherwise express himself or herself. As another example and not by way of limitation, a concept node 504 may have a corresponding concept-profile page in which one or more users may add content, make declarations, or express themselves, particularly in relation to the concept corresponding to concept node 504.

In particular embodiments, a concept node 504 may represent a third-party webpage or resource hosted by a third-party system 470. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 430 to send to social-networking system 460 a message indicating the user's action. In response to the message, social-networking system 460 may create an edge (e.g., a check-in-type edge) between a user node 502 corresponding to the user and a concept node 504 corresponding to the third-party webpage or resource and store edge 506 in one or more data stores.

In particular embodiments, a pair of nodes in social graph 500 may be connected to each other by one or more edges 506. An edge 506 connecting a pair of nodes may represent a relationship between the pair of nodes. In particular embodiments, an edge 506 may include or represent one or more data objects or attributes corresponding to the relationship between a pair of nodes. As an example and not by way of limitation, a first user may indicate that a second user is a "friend" of the first user. In response to this indication, social-networking system 460 may send a "friend request" to the second user. If the second user confirms the "friend request," social-networking system 460 may create an edge 506 connecting the first user's user node 502 to the second user's user node 502 in social graph 500 and store edge 506 as social-graph information in one or more of data stores 464. In the example of FIG. 5, social graph 500 includes an edge 506 indicating a friend relation between user nodes 502 of user "A" and user "B" and an edge indicating a friend relation between user nodes 502 of user "C" and user "B." Although this disclosure describes or illustrates particular edges 506 with particular attributes connecting particular user nodes 502, this disclosure contemplates any suitable edges 506 with any suitable attributes connecting user nodes 502. As an example and not by way of limitation, an edge 506 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 500 by one or more edges 506.

In particular embodiments, an edge 506 between a user node 502 and a concept node 504 may represent a particular action or activity performed by a user associated with user node 502 toward a concept associated with a concept node 504. As an example and not by way of limitation, as illustrated in FIG. 5, a user may "like," "attended," "played," "listened," "cooked," "worked at," or "watched" a concept, each of which may correspond to an edge type or subtype. A concept-profile page corresponding to a concept node 504 may include, for example, a selectable "check in" icon (such as, for example, a clickable "check in" icon) or a selectable "add to favorites" icon. Similarly, after a user clicks these icons, social-networking system 460 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 460 may create a "listened" edge 506 and a "used" edge (as illustrated in FIG. 5) between user nodes 502 corresponding to the user and concept nodes 504 corresponding to the song and application to indicate that the user listened to the song and used the application. Moreover, social-networking system 460 may create a "played" edge 506 (as illustrated in FIG. 5) between concept nodes 504 corresponding to the song and the application to indicate that the particular song was played by the particular application. In this case, "played" edge 506 corresponds to an action performed by an external application (SPOTIFY) on an external audio file (the song "Imagine"). Although this disclosure describes particular edges 506 with particular attributes connecting user nodes 502 and concept nodes 504, this disclosure contemplates any suitable edges 506 with any suitable attributes connecting user nodes 502 and concept nodes 504. Moreover, although this disclosure describes edges between a user node 502 and a concept node 504 representing a single relationship, this disclosure contemplates edges between a user node 502 and a concept node 504 representing one or more relationships. As an example and not by way of limitation, an edge 506 may represent both that a user likes and has used at a particular concept. Alternatively, another edge 506 may represent each type of relationship (or multiples of a single relationship) between a user node 502 and a concept node 504 (as illustrated in FIG. 5 between user node 502 for user "E" and concept node 504 for "SPOTIFY").

In particular embodiments, social-networking system 460 may create an edge 506 between a user node 502 and a concept node 504 in social graph 500. As an example and not by way of limitation, a user viewing a concept-profile page (such as, for example, by using a web browser or a special-purpose application hosted by the user's client system 430) may indicate that he or she likes the concept represented by the concept node 504 by clicking or selecting a "Like" icon, which may cause the user's client system 430 to send to social-networking system 460 a message indicating the user's liking of the concept associated with the concept-profile page. In response to the message, social-networking system 460 may create an edge 506 between user node 502 associated with the user and concept node 504, as illustrated by "like" edge 506 between the user and concept node 504. In particular embodiments, social-networking system 460 may store an edge 506 in one or more data stores. In particular embodiments, an edge 506 may be automatically formed by social-networking system 460 in response to a particular user action. As an example and not by way of limitation, if a first user uploads a picture, watches a movie, or listens to a song, an edge 506 may be formed between user node 502 corresponding to the first user and concept nodes 504 corresponding to those concepts. Although this disclosure describes forming particular edges 506 in particular manners, this disclosure contemplates forming any suitable edges 506 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 460). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 460 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 460) or RSVP (e.g., through social-networking system 460) to an event associated with the advertisement. In addition or as an alternative, an advertisement may include social-networking-system content directed to the user. As an example and not by way of limitation, an advertisement may display information about a friend of the user within social-networking system 460 who has taken an action associated with the subject matter of the advertisement.

In particular embodiments, social-networking system 460 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 470 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 460 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 460 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 460 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 460 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 460 may calculate a coefficient based on a user's actions. Social-networking system 460 may monitor such actions on the online social network, on a third-party system 470, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 460 may calculate a coefficient based on the user's actions with particular types of content. The content may be associated with the online social network, a third-party system 470, or another suitable system. The content may include users, profile pages, posts, news stories, headlines, instant messages, chat room conversations, emails, advertisements, pictures, video, music, other suitable objects, or any combination thereof. Social-networking system 460 may analyze a user's actions to determine whether one or more of the actions indicate an affinity for subject matter, content, other users, and so forth. As an example and not by way of limitation, if a user frequently posts content related to "coffee" or variants thereof, social-networking system 460 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 460 may calculate a coefficient based on the type of relationship between particular objects. Referencing the social graph 500, social-networking system 460 may analyze the number and/or type of edges 506 connecting particular user nodes 502 and concept nodes 504 when calculating a coefficient. As an example and not by way of limitation, user nodes 502 that are connected by a spouse-type edge (representing that the two users are married) may be assigned a higher coefficient than a user nodes 502 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 460 may determine that the user has a higher coefficient with respect to the first photo than the second photo because having a tagged-in-type relationship with content may be assigned a higher weight and/or rating than having a like-type relationship with content. In particular embodiments, social-networking system 460 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 460 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 500. As an example and not by way of limitation, social-graph entities that are closer in the social graph 500 (i.e., fewer degrees of separation) may have a higher coefficient than entities that are further apart in the social graph 500.

In particular embodiments, social-networking system 460 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 430 of the user). A first user may be more interested in other users or concepts that are closer to the first user. As an example and not by way of limitation, if a user is one mile from an airport and two miles from a gas station, social-networking system 460 may determine that the user has a higher coefficient for the airport than the gas station based on the proximity of the airport to the user.

In particular embodiments, social-networking system 460 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 460 may provide information that is relevant to user's interests and current circumstances, increasing the likelihood that they will find such information of interest. In particular embodiments, social-networking system 460 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 460 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 460 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 470 (e.g., via an API or other communication channel), or from another suitable system. In response to the request, social-networking system 460 may calculate the coefficient (or access the coefficient information if it has previously been calculated and stored). In particular embodiments, social-networking system 460 may measure an affinity with respect to a particular process. Different processes (both internal and external to the online social network) may request a coefficient for a particular object or set of objects. Social-networking system 460 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Figure 6:
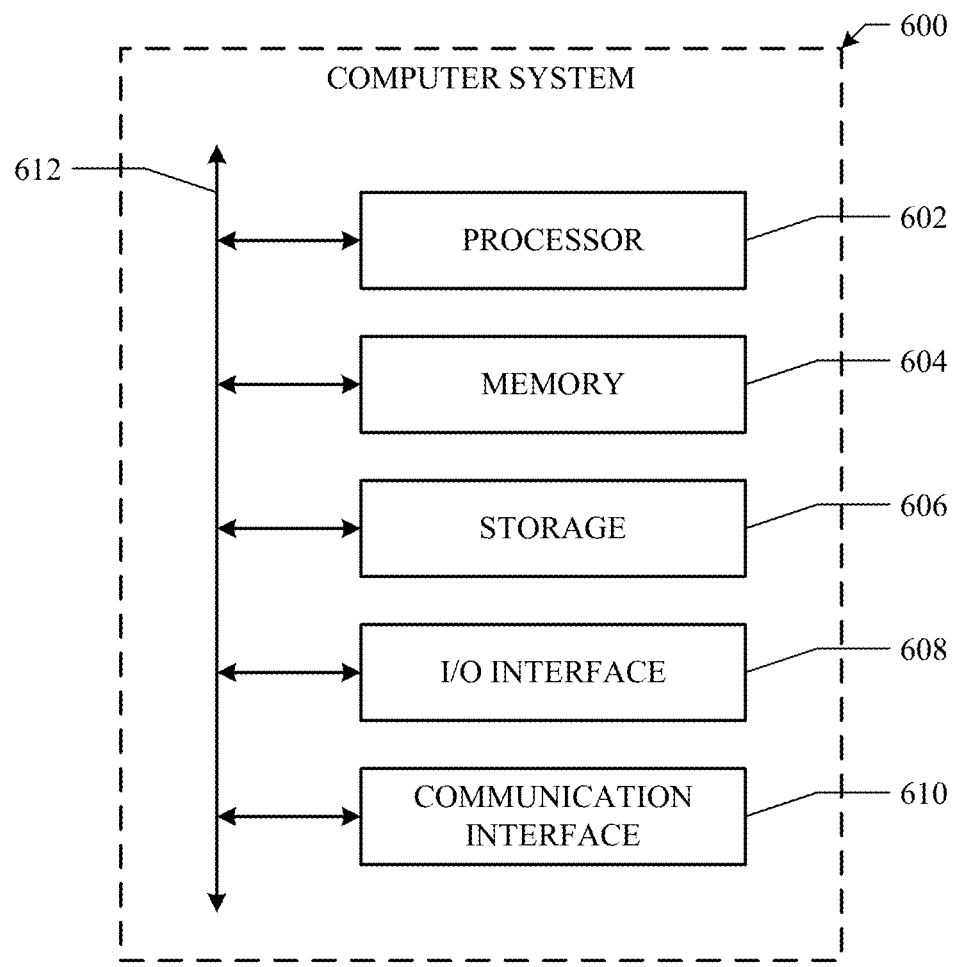
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computing system associated with a social network, receiving a first request to publish a live video, the first request being received from a third-party computing system relative to the social network, the first request comprising a first network address associated with the third-party computing system;
   by the computing system, in response to the first request to publish the live video, generating a live video object that represents the live video in a social graph;
   by the computing system, receiving a second request for content from a first user device associated with a first user; and
   by the computing system, in response to the second request, transmitting to the first user device display instructions, the first network address associated with the third-party computing system, a second network address from which the live video is available, and a third network address from which an interface application is available;
   wherein the display instructions are configured to cause the first user device to:
      configure a video player application to display the live video obtained using the second network address;
      obtain the interface application using the third network address;
      configure the interface application to be displayed over at least a portion of the live video; and
      configure the interface application to communicate with the third-party computing system using the first network address;
   wherein the interface application is configured to:
      receive, from the first user of the first user device, a reaction or comment while the video player application displays the live video;
      transmit the received reaction or comment to the third-party computing system using the first network address;
      receive, from the third-party computing system, information associated with reactions or comments from other users viewing the live video on their respective user devices; and
      display the information associated with reaction or comments from the other users while the video player application displays the live video.

2. The method of claim 1, further comprising:
   by the computing system, receiving a deeplink from the third-party computing system, the deeplink being configured to cause an application associated with the third-party computing system to be launched, the deeplink comprising instructions for the application to initiate an action; and
   by the computing system, in response to the second request, transmitting the deeplink to the first user device;
   wherein the display instructions are further configured to cause the first user device to be configured to receive an input activating the deeplink and, in response to the input, launch the application installed on the first user device associated with the deeplink.

3. The method of claim 2, wherein the instructions comprised in the deeplink are associated with content in the live video.

4. The method of claim 3,
   wherein the content in the live video is of a gaming application installed on a second user device being played in a gaming session;
   wherein the deeplink is configured to cause the application installed on the first user device to be launched;
   wherein the action initiated by the instructions in the deeplink causes the application installed on the first user device to interact with the gaming application installed on the second user device through the gaming session.

5. The method of claim 1, wherein the live video is of content published by a second user of the social network through an application associated with the third-party computing system, wherein the application is being executed on a second user device associated with the second user; and
   wherein the live video object in the social graph is associated with a user object in the social graph representing the second user.

6. The method of claim 5, wherein the first user and the second user are represented in the social graph within a threshold degree of separation.

7. The method of claim 1, further comprising:
by the computing system, presenting the live video on the first user device in a newsfeed associated with the social network, wherein the live video is associated with an activation element;
wherein the display instructions are executed upon user activation of the activation element.

8. The method of claim 1, wherein the interface application is configured to:
receive input from the first user;
transmit data corresponding to the input to the third-party computing system; and
process instructions from the third-party computing system.

9. The method of claim 8,
wherein the live video is of content published by a second user of the social network through an application associated with the third-party computing system, wherein the application is being executed on a second user device associated with the second user;
wherein the data corresponding to the input from the first user is configured to cause the third-party computing system to cause the application on the second user device to display information associated with the input from the first user.

10. One or more computer-readable non-transitory storage media embodying software that is operable when executed to cause a computing system associated with a social network to:
receive a first request to publish a live video, the first request being received from a third-party computing system relative to the social network, the first request comprising a first network address associated with the third-party computing system;
in response to the first request to publish the live video, generate a live video object that represents the live video in a social graph;
receive a second request for content from a first user device associated with a first user; and
in response to the second request, transmit to the first user device display instructions, the first network address associated with the third-party computing system, a second network address from which the live video is available, and a third network address from which an interface application is available;
wherein the display instructions are configured to cause the first user device to:
configure a video player application to display the live video obtained using the second network address;
obtain the interface application using the third network address;
configure the interface application to be displayed over at least a portion of the live video; and
configure the interface application to communicate with the third-party computing system using the first network address;
wherein the interface application is configured to:
receive, from the first user of the first user device, a reaction or comment while the video player application displays the live video;
transmit the received reaction or comment to the third-party computing system using the first network address;
receive, from the third-party computing system, information associated with reactions or comments from other users viewing the live video on their respective user devices; and
display the information associated with reaction or comments from the other users while the video player application displays the live video.

11. The media of claim 10, wherein the software is further operable when executed to:
receive a deeplink from the third-party computing system, the deeplink being configured to cause an application associated with the third-party computing system to be launched, the deeplink comprising instructions for the application to initiate an action; and
in response to the second request, transmit the deeplink to the first user device;
wherein the display instructions are further configured to cause the first user device to be configured to receive an input activating the deeplink and, in response to the input, launch the application installed on the first user device associated with the deeplink.

12. The media of claim 11, wherein the instructions comprised in the deeplink are associated with content in the live video.

13. The media of claim 12,
wherein the content in the live video is of a gaming application installed on a second user device being played in a gaming session;
wherein the deeplink is configured to cause the application installed on the first user device to be launched;
wherein the action initiated by the instructions in the deeplink causes the application installed on the first user device to interact with the gaming application installed on the second user device through the gaming session.

14. The media of claim 10, wherein the interface application is configured to:
receive input from the first user;
transmit data corresponding to the input to the third-party computing system; and
process instructions from the third-party computing system.

15. A computing system associated with a social network, comprising:
one or more processors; and
one or more computer-readable non-transitory storage media coupled to one or more of the processors and comprising instructions operable when executed by one or more of the processors to cause the system to:
receive a first request to publish a live video, the first request being received from a third-party computing system relative to the social network, the first request comprising a first network address associated with the third-party computing system;
in response to the first request to publish the live video, generate a live video object that represents the live video in a social graph;
receive a second request for content from a first user device associated with a first user; and
in response to the second request, transmit to the first user device display instructions, the first network address associated with the third-party computing system, a second network address from which the live video is available, and a third network address from which an interface application is available;
wherein the display instructions are configured to cause the first user device to:

configure a video player application to display the live video obtained using the second network address;

obtain the interface application using the third network address;

configure the interface application to be displayed over at least a portion of the live video; and configure the interface application to communicate with the third-party computing system using the first network address;

wherein the interface application is configured to:

receive, from the first user of the first user device, a reaction or comment while the video player application displays the live video;

transmit the received reaction or comment to the third-party computing system using the first network address;

receive, from the third-party computing system, information associated with reactions or comments from other users viewing the live video on their respective user devices; and display the information associated with reaction or comments from the other users while the video player application displays the live video.

16. The system of claim 15, wherein the processors are further operable when executing the instructions to:

receive a deeplink from the third-party computing system, the deeplink being configured to cause an application associated with the third-party computing system to be launched, the deeplink comprising instructions for the application to initiate an action; and in response to the second request, transmit the deeplink to the first user device;

wherein the display instructions are further configured to cause the first user device to be configured to receive an input activating the deeplink and, in response to the input, launch the application installed on the first user device associated with the deeplink.

17. The system of claim 16, wherein the instructions comprised in the deeplink are associated with content in the live video.

18. The system of claim 17, wherein the content in the live video is of a gaming application installed on a second user device being played in a gaming session;

wherein the deeplink is configured to cause the application installed on the first user device to be launched;

wherein the action initiated by the instructions in the deeplink causes the application installed on the first user device to interact with the gaming application installed on the second user device through the gaming session.

19. The system of claim 15, wherein the interface application is configured to:

receive input from the first user;

transmit data corresponding to the input to the third-party computing system; and process instructions from the third-party computing system.

* * * * *